May 23, 1933.  S. G. BAITS  1,910,376
TRANSMISSION
Filed July 3, 1931
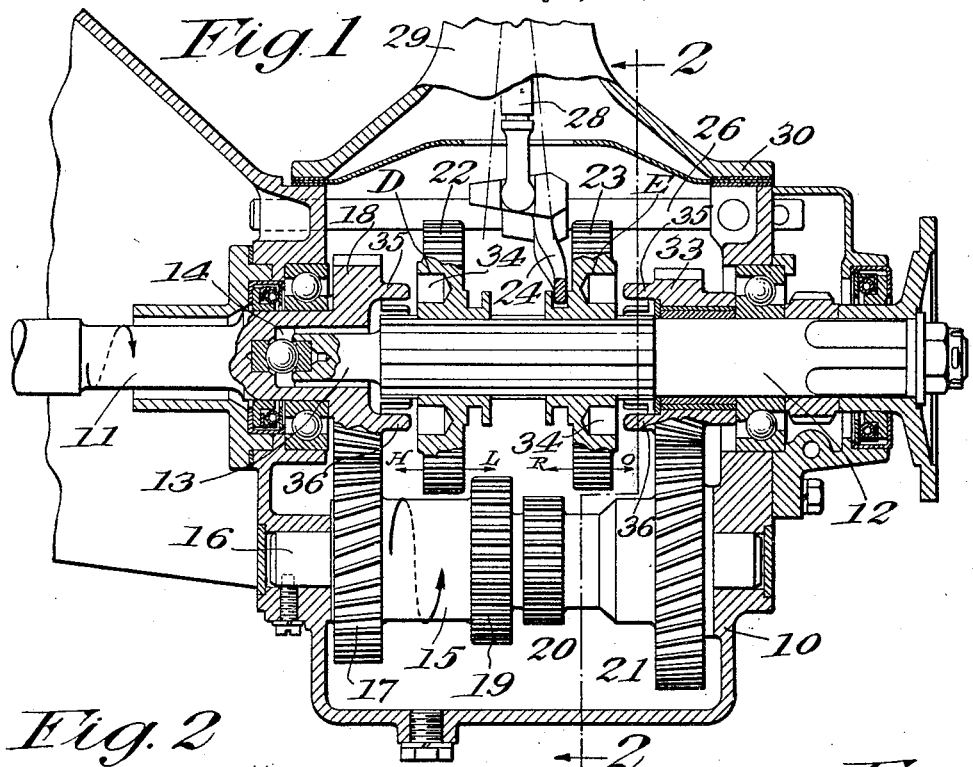
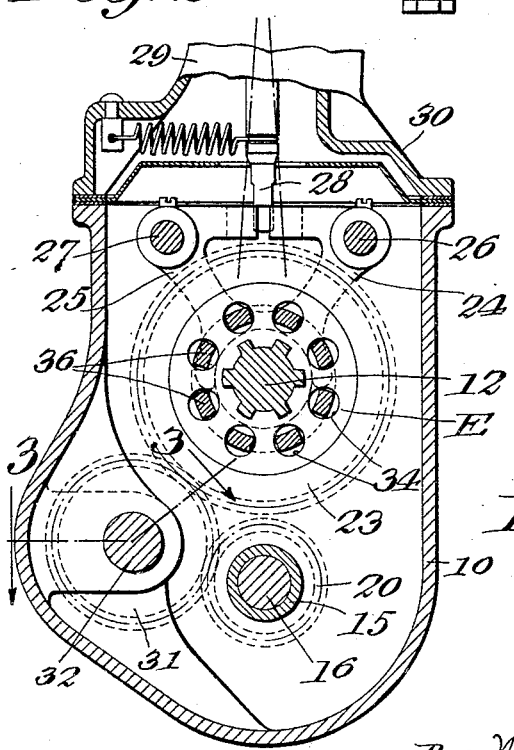
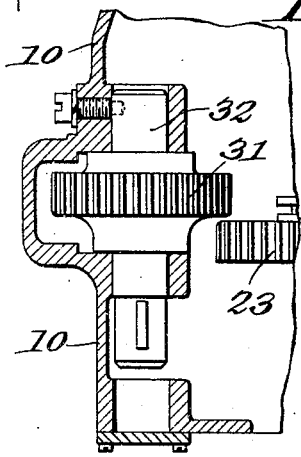
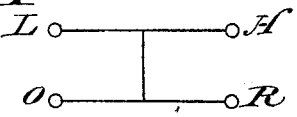
Inventor:
Stuart G. Baits
By Macleod Calvr Copeland & Lee
Attorneys Patented May 23, 1933

1,910,376

UNITED STATES PATENT OFFICE

STUART G. BAITS, OF GROSSE POINTE PARK, MICHIGAN, ASSIGNOR TO HUDSON MOTOR CAR COMPANY, OF DETROIT, MICHIGAN, A CORPORATION OF MICHIGAN

TRANSMISSION

Application filed July 3, 1931. Serial No. 548,533.

This invention relates to a change speed power transmitting mechanism for motor vehicles and has for one of its objects to provide a simple and inexpensive but efficient "overdrive" transmission, that is to say, a transmission having provision whereby the driven shaft may be driven at a greater speed than that of the driving shaft.

In such transmissions the overdrive must be effected through at least two pairs of intermeshing gears, the operation of which is disagreeably noisy. This objectionable feature can be largely overcome by the substitution of helical or spiral gears for the conventional spur gears. Such gears, however, tend to impose a longitudinal thrust on the countershaft by which one of the gears of each pair is carried, and the present invention has for another object to provide a construction wherein such thrust is eliminated. While particularly well adapted to an overdrive transmission, this feature of the invention is not limited to such a transmission but is applicable to any form of transmission wherein the drive is effected through gears on a countershaft meshing respectively with gears on the driving and driven shafts.

A further object of the invention is to provide a simple and effective form of jaw clutch for operatively connecting the helical gears with their respective shafts.

The foregoing and other objects of the invention will best be understood from the following description of a preferred embodiment thereof illustrated in the accompanying drawing. It will be understood, however, that the particular construction described and shown has been chosen for purposes of exemplification merely, and that the invention, as defined by the claims hereunto appended, may be otherwise embodied without departure from its spirit and scope.

In said drawing:

Fig. 1 is a central longitudinal vertical section of the transmission mechanism;

Fig. 2 is a transverse vertical section taken substantially on the line 2—2, Fig. 1, Fig. 3 is a detail section taken substantially on the line 3—3, Fig. 2, Fig. 4 is a diagram showing the several positions of the gear shifting lever.

The invention is herein shown as embodied in a transmission adapted to provide a first or low speed drive, a direct or high speed drive, an overdrive, and a reverse drive.

In the drawing, 10 denotes the transmission casing which is of a suitable size and shape to enclose the mechanism and to provide the necessary supports and bearings for the various parts thereof. As shown, said casing is substantially identical in form and dimensions with the casing employed in connection with a well known design of standard transmission.

11 denotes the driving shaft and 12 the driven shaft, journalled respectively in bearings in the front and rear walls of the casing and coaxially disposed so as to form in effect a continuous main shaft, said driven shaft having a reduced forward end 13 journalled in an axial recess 14 in the rear end of the driving shaft 11. Disposed below the main shaft and parallel thereto is a jackshaft or countershaft, herein shown as comprising a sleeve 15 rotatably mounted on an arbor 16 supported at its ends by the front and rear walls of the casing 10, said sleeve having fast thereon or formed integral therewith certain gears hereinafter referred to.

The countershaft 15 is driven from the driving shaft 11 through a gear 17 on said countershaft in constant mesh with a gear 18 on the driving shaft and is also provided with additional gears 19, 20 and 21. Splined on the driven shaft 12 are two gears 22 and 23 slidable on said shaft in opposite directions from the neutral positions shown by means of forks or arms 24 and 25 carried by the usual shifter slides 26 and 27 selectively operable by the shifter lever 28 mounted for universal movement in any usual or well known manner in a column 29 rising from the transmission casing cover 30. The gear 20 on the countershaft 16 meshes with a reversing gear 31 rotatably mounted on an arbor 32 suitably supported in the transmission casing. The gear 21, which is relatively large, is in constant mesh with a relatively smaller gear 33 loose on the driven shaft 12. The gears 18 and 22 are formed respectively with the co-acting elements of a jaw clutch D whereby, when the gear 22 is slid on the shaft 12 toward the left from the position shown in Fig. 1, said gears will be connected for rotation in unison. The gears 23 and 33 are formed with the elements of a similar clutch E adapted, when the gear 23 is moved to the right from the position shown, to couple said gears for rotation in unison.

In operation, when the lever 28 is operatively engaged with the shifter slide 27 and moved into the position designated L in Fig. 4, the gear 22 is moved to the right into mesh with the gear 19, thereby connecting the parts for the first or low speed drive. When said lever is still engaged with the slide 27 and is moved into the position H, the gear 22 is moved toward the left, thereby engaging the clutch D and connecting the driving and driven shafts 11 and 12 for the direct or high speed drive. When the lever 28 is operatively engaged with the slide 26 and moved into the position O, the gear 23 is moved toward the right, thereby engaging the clutch E and connecting the parts for the overdrive. When the lever 28, while in engagement with the slide 26, is moved into the position R, the gear 23 is slid to the left into engagement with the reversing gear 31, thereby connecting the parts for the reverse drive.

The co-acting gears of each of the pairs 17, 18 and 21, 33 are formed with helical or spiral teeth whereby the overdrive is effected wholly through such spiral or helical gearing, thereby rendering the same relatively quiet. The direction of inclination of the teeth on the several gears is the same, whereby the longitudinal component of the force exerted by the gear 18 upon the gear 17 opposes the longitudinal component of the force exerted by the gear 21 on the gear 33, but since the gears 17 and 21 however are of different sizes, these horizontal components or thrusts do not exactly balance or neutralize one another. I have discovered that the balancing of these forces, so as to relieve the countershaft of horizontal thrust, may be effected by proportioning the helical angles of the teeth to the sizes of the respective gears. The mode of determining this relationship is a follows: Let F = peripheral driving force exerted between gears 17 and 18.
G = peripheral driving force exerted between gears 21 and 33.
T = end thrust or axial component of the driving force on gear 17.
T' = end thrust or axial component of the driving force on gear 21.
$a$ = helical angle of teeth on gears 17 and 18.
$a'$ = helical angle of teeth on gears 21 and 23.

F and G are, of course, functions of the relative diameters of the several gears and can be readily computed in a well known manner for a given gear set in terms of the initial driving torque imparted by the engine. Then $$T = F \tan a, \text{ and}$$
$$T' = G \tan a',$$

and, since it is desired that $$T = T',$$

the angles $a$ and $a'$ are, in accordance with the invention, so chosen that $$F \tan a = G \tan a'$$

Each of the clutches D and E preferably comprises a circular series of cavities or recesses 34 drilled or otherwise formed in the lateral face of the gear 22 or 23 and a cylindrical flange 35 formed on the adjacent face of the gear 18 or 33, said flange being cut through or interrupted at intervals to form a corresponding series of projections 36 adapted, when the gear 22 or 23 is slid in the direction to engage the clutch, to enter the cavities 34. This constitutes a simple and effective form of jaw clutch which can be produced at trifling expense and which is reliable in action and not subject to early failure by reason of the wear or breakage, it being seen that the ends of the projections 36 will ride idly over the smooth lateral face of the opposing gear until brought into register with the cavities 34 which they can readily enter.

I claim:

1. In a motor vehicle transmission, in combination, a driving shaft, an axially alined driven shaft, a clutch adapted to connect said shafts for the direct drive, a countershaft driven from said driving shaft at substantially the same speed, a relatively small gear loose on said driven shaft, a relatively larger gear on said countershaft in constant mesh with said loose gear, a reversing gear driven from said countershaft, a gear splined on said driven shaft, and a clutch for connecting said loose and splined gears with each other, said splined gear being slidable on said driven shaft in one direction into mesh with said reversing gear and in the opposite direction to engage said clutch.

2. In a motor vehicle transmission, in combination, a driving shaft, an axially alined driven shaft, a countershaft, a gear fast on said driving shaft, an intermeshing gear fast on said countershaft, a gear loose on said driven shaft, a larger gear fast on said countershaft and meshing with said loose gear to provide an overdrive, a pair of gears splined on said driven shaft, a pair of co-acting gears driven by said countershaft and adapted to mesh respectively with said splined gears, a clutch for connecting one of said splined gears with said driving shaft gear, and a clutch for connecting the other of said splined gears with said loose gear, each of said splined gears being slidable on said driven shaft in one direction into mesh with its respective co-acting countershaft gear and in the opposite direction to engage its respective clutch.

In testimony whereof I affix my signature.

STUART G. BAITS.